United States Patent [19]
Lee

[11] Patent Number: 5,502,358
[45] Date of Patent: Mar. 26, 1996

[54] METHOD AND APPARATUS FOR CONTROLLING THE TENSION OF A POWER CORD OF A SELF-PROPELLED ROBOT

[75] Inventor: Jae-Bong Lee, Seoul, Rep. of Korea

[73] Assignee: Samsung Electronics Co., Ltd., Suwon, Rep. of Korea

[21] Appl. No.: 297,931

[22] Filed: Aug. 31, 1994

[30]    Foreign Application Priority Data

Sep. 1, 1993 [KR] Rep. of Korea ............... 93-17425

[51] Int. Cl.$^6$ ................................................ B65H 59/38
[52] U.S. Cl. .................... 318/6; 318/286; 191/12.2 A; 242/420.5
[58] Field of Search ................ 191/12 R, 12.2 A; 901/1.50; 242/410, 412, 412.2, 416, 420.5, 420.6; 318/3.6, 280, 281, 282–286, 445–446, 466

[56]    References Cited

U.S. PATENT DOCUMENTS

4,511,100  4/1985  Oetringhaus ................... 242/86.51
4,736,826  4/1988  White et al. ................... 191/12.2 A

*Primary Examiner*—David S. Martin
*Attorney, Agent, or Firm*—Burns, Doane, Swecker & Mathis

[57]    ABSTRACT

A self-propelled robot includes an electrical cord mounted on a spool for being drawn-in or drawn-out. A sensor senses a rate at which the cord is drawn in or drawn out and actuates a motor connected to the spool for applying a rotary force to the spool to control the cord tension.

4 Claims, 6 Drawing Sheets

METHOD AND APPARATUS FOR CONTROLLING THE TENSION OF A POWER CORD OF A SELF-PROPELLED ROBOT

BACKGROUND OF THE INVENTION

1. Field of the Invention

The present invention relates in general to operational control for self-propelled robots such as self-propelled robot cleaners and, more particularly, to a device and method for controlling the tension of a power cord of such a self-propelled robot for releasing the tension applied on the power cord in occurrence of a sudden happening or in rapid self-propelled turning motion of the robot during operation of the robot, thereby preventing possible deviation of the self-propelled robot from its intended running (travel) direction.

2. Description of the Prior Art

There have been proposed devices for controlling the tension of power cords of self-propelled robots, such as self-propelled vacuum cleaners, as disclosed in this inventor's U.S. patent application No. 08/175,536 filed on Dec. 30, 1993). The typical cord tension control device disclosed in the above U.S. patent application is shown in the accompanying drawings, FIGS. 1A and 1B. As shown in these drawings, the cord tension control device includes a plate spring 720 adapted for provision of cord rewind tension for a power cord designated by the numeral 300. Mounted on the casing wall of the control device are first and second optical sensors 210 and 220, each adapted for sensing draw-in and draw-out motions of the power cord 300 and the length of cord extension and retraction. The cord tension control device also includes a motor 500 for keeping a predetermined constant tension of the power cord 300 by tightening or loosening the spring 720. The inner end of the spring 720 is fixed to a shaft 721 driven by motor 500, and the outer end of the spring is fixed to a spool 710 on which the cord 300 is wound.

Figure 1A:
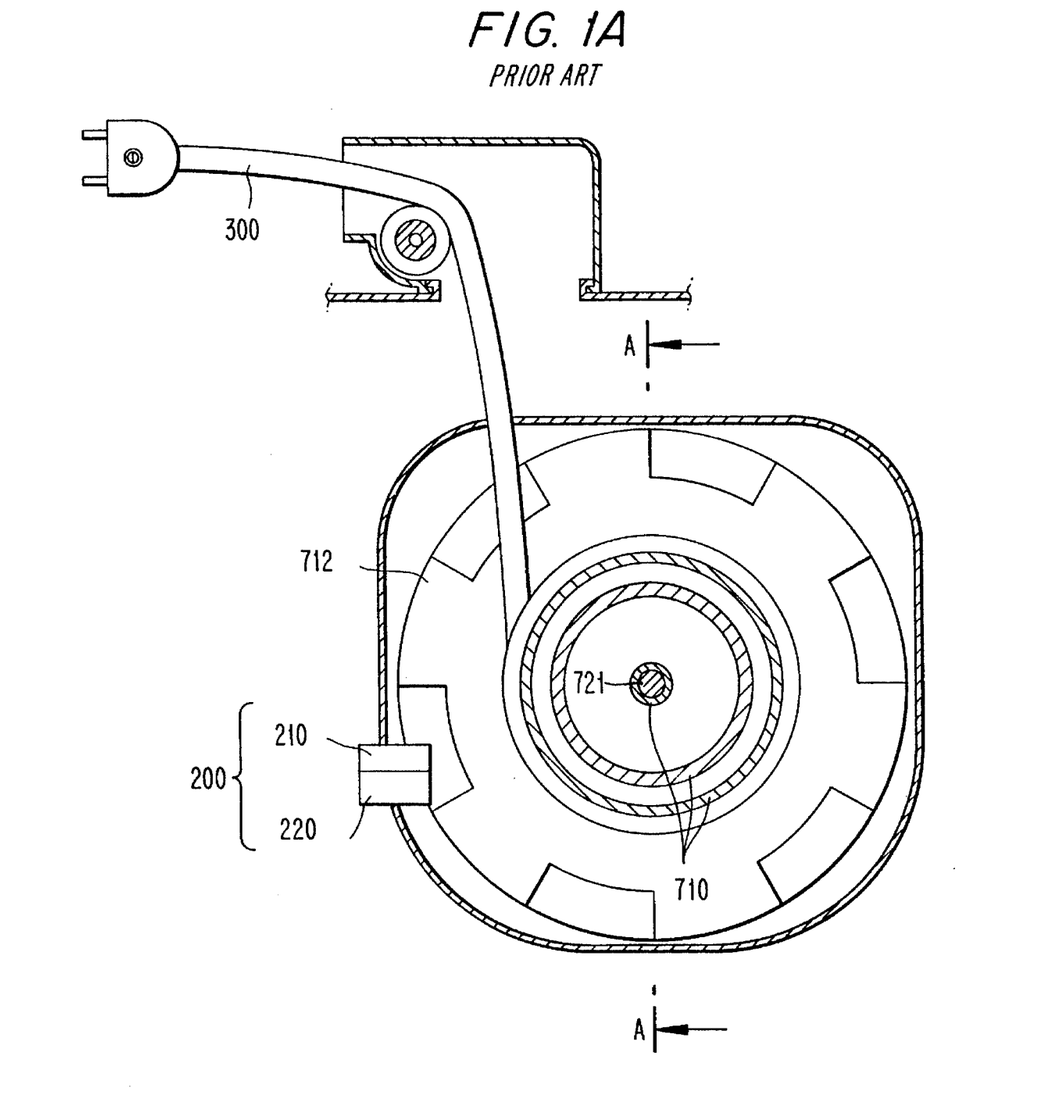
FIG. 1A is a cross sectional view of a cord tension control device for self-propelled robot in accordance with both the prior art and an embodiment of the present invention.
Figure 1B:
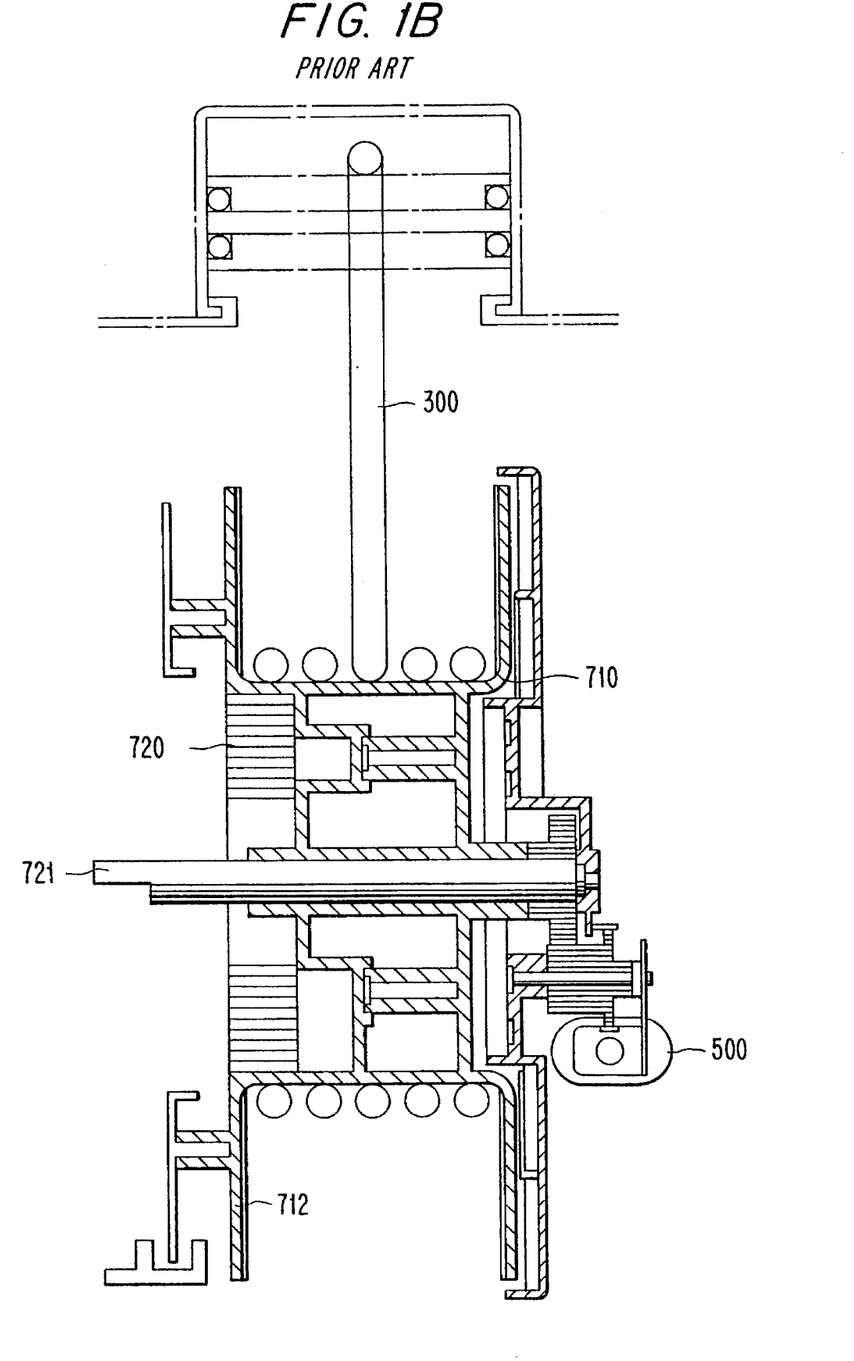
FIG. 1B is a sectional view of the cord tension control device taken along the section line A—A of FIG. 1A.

The above cord tension control device somewhat reliably keeps the predetermined constant tension of the cord 300 in response to variation of distance between the self-propelled robot and a plug socket when running on a flat surface. However, the cord tension control device has a problem that it can not precisely rapidly control a high tension instantaneously applied on the cord 300 in occurrence of a sudden happening or in response to a rapid self-propelled turning motion of the robot during operation of the robot.

When the cord 300 is subjected to such instantaneously increased tension, the wheels of the self-propelled robot may slip, so that there occurs not only abrasion of the wheels but also a deviation of the robot from its intended running direction.

SUMMARY OF THE INVENTION

It is, therefore, an object of the present invention to provide a device for controlling tension of a power cord of a self-propelled robot in which the above problem can be overcome and which releases high tension instantaneously applied on the power cord in occurrence of a sudden happening or in rapid self-propelled turning motion of the robot during robot operation, thus to prevent possible deviation of the self-propelled robot from its intended running path during robot operation.

It is another object of this invention to provide a method for controlling the tension of a power cord of a self-propelled robot.

In one aspect, the present invention provides a device for controlling a tension of a cord of a self-propelled robot comprising: a microcomputer; means for sensing a cord-in motion and a cord-out motion and outputting a cord-in signal or a cord-out signal to the microcomputer; a motor drive unit for driving a motor upon reception of a motor drive signal of the microcomputer so as to control the tension applied on the cord; and a Hall sensor for sensing revolutions of the motor and outputting a motor revolution signal to the microcomputer.

In another aspect, the present invention provides a method for controlling a tension of a cord of a self-propelled robot using the cord tension control device, comprising the steps of: determining whether the robot's running direction has been changed; determining whether the robot's running direction is changed now when determining that the robot's running direction has not been changed; determining whether the cord is drawn out from the robot now when determining that the robot's running direction is not changed now; counting up the number of pulses of a signal outputted from the cord-in/out motion sensing means when determining that the cord is drawn out from the robot now; determining whether the counted value of the above pulse counting step is equal to a first preset value; and rotating a motor by predetermined revolutions according to a second preset value so as to release the tension of the cord when determining that the counted value is equal to the first preset value.

BRIEF DESCRIPTION OF THE DRAWINGS

Other objects and aspects of this invention will become apparent from the following description of embodiments with reference to the accompanying drawings, in which.

DESCRIPTION OF THE PREFERRED EMBODIMENTS

FIGS. 1A and 1B show a cord tension control device for self-propelled robot in accordance with not only the prior art but also a preferred embodiment of the present invention.

As shown in FIGS. 1A and 1B, the edge of the rotating disc 710 is provided with a plurality of regularly spaced teeth 712 for periodically screening the light emitted from the first and second optical sensors 210 and 220. Placed in the interior of the rotating disc 710 is a plate spring 720 that always biases the rotating disc 710 and causes this disc 710 to have rotating force (i.e., provide a spring bias) in a direction for drawing in the cord 300. Alternatively, the spring could provide a bias in a direction for drawing out the cord 300.

Figure 3:
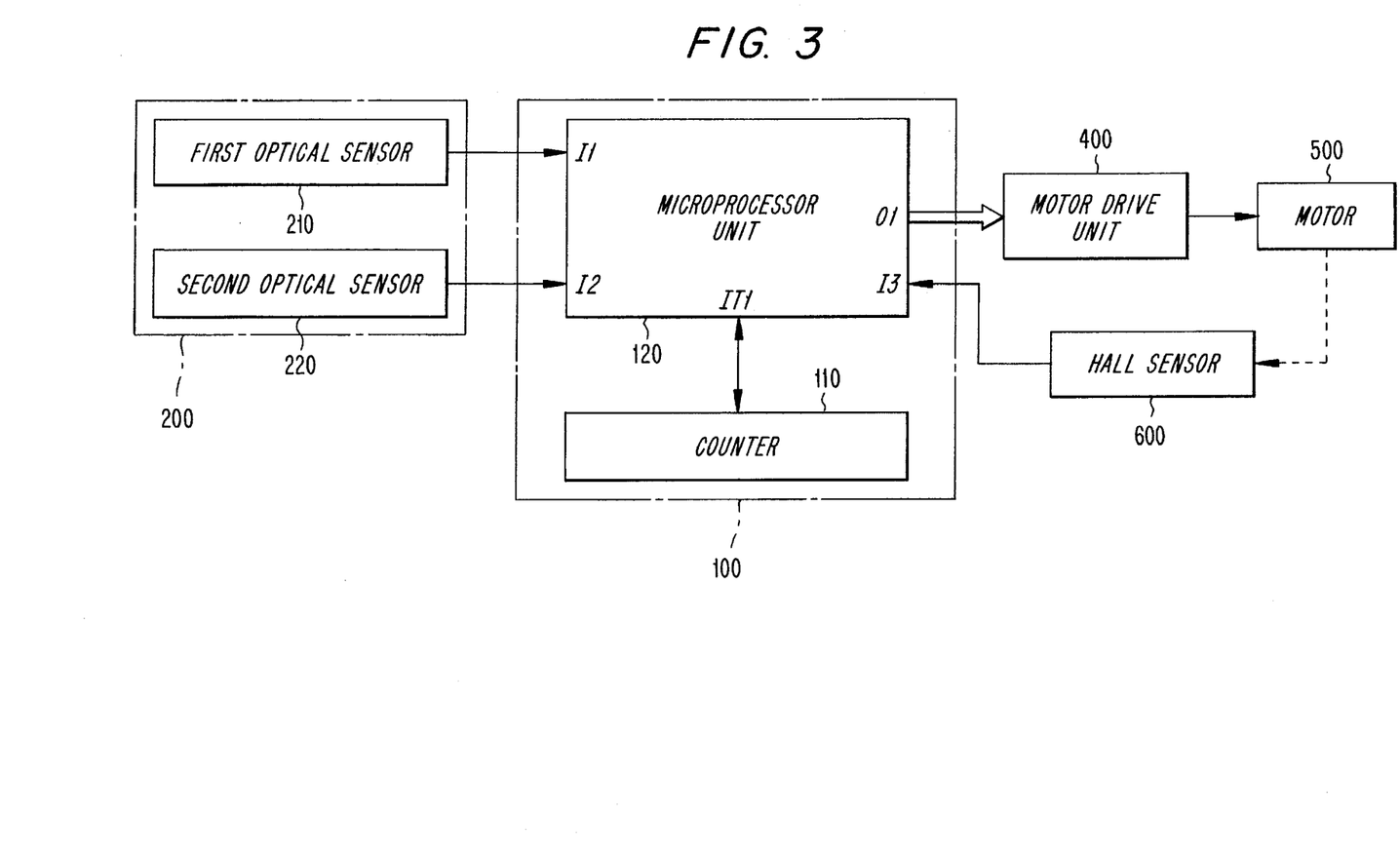
FIG. 3 is a block diagram showing a construction of the cord tension control device for self-propelled robot in accordance with the present invention.

Turning to FIG. 3 showing in a block diagram a construction of the cord tension control device of this invention, the tension control device is operated under the control of microcomputer 100. The microcomputer 100 includes a counter 110 for counting a cord-in signal, cord-out signal and a motor revolution signal.

The first and second optical sensors 210 and 220, which are mounted on the casing wall of the device, constitute cord-in/out sensing means 200. This sensing means 200 outputs a sensing signal to the microcomputer 100 upon sensing either a cord-in motion or a cord-out motion.

The numeral 400 of the block diagram of FIG. 3 denotes a motor drive unit which rotates the motor 500 upon reception of a motor drive signal outputted from the microcomputer 100, thus to control the tension applied on the cord 300. The motor drive unit 400 comprises a DC voltage supply circuit for applying forward DC voltage, reverse DC voltage or zero DC voltage to the motor 500 upon reception of the motor drive signal outputted from the microcomputer 100.

A Hall sensor 600 is placed about a rotating shaft of the motor 500. This Hall sensor 600 senses revolutions of the the motor 500 and applies motor revolution signal to the microcomputer 100 so as to control the tension of the cord 300.

In operation of the cord tension device of this invention, the power cord 300 is drawn out from the rotating disc 710 and its plug is inserted into a plug socket (not shown). As a result of insertion of the cord plug into the plug socket, a cord tension control process is started in order to control the initial tension of the cord 300 as shown at the time from $T_0$ to $T_2$ of the graph of FIG. 5.

At this time, the tension initially applied to the power cord 300 will be referred to as the initial tension of the cord 300.

The initial tension of the cord 300 means an appropriate tension suitable for initial operation of the robot since the initial cord tension is weak when the initial position of the self-propelled robot is close to the plug socket, however, the initial cord tension is strong when the initial position of the self-propelled robot is far from the plug socket.

Thereafter, a cord tension control command is inputted into the microcomputer 100 using a control panel placed on the front of the robot or using a remote controller. As a result of input of the tension control command, the self-propelled robot starts a preset operation while running along an intended running path.

Figure 4:
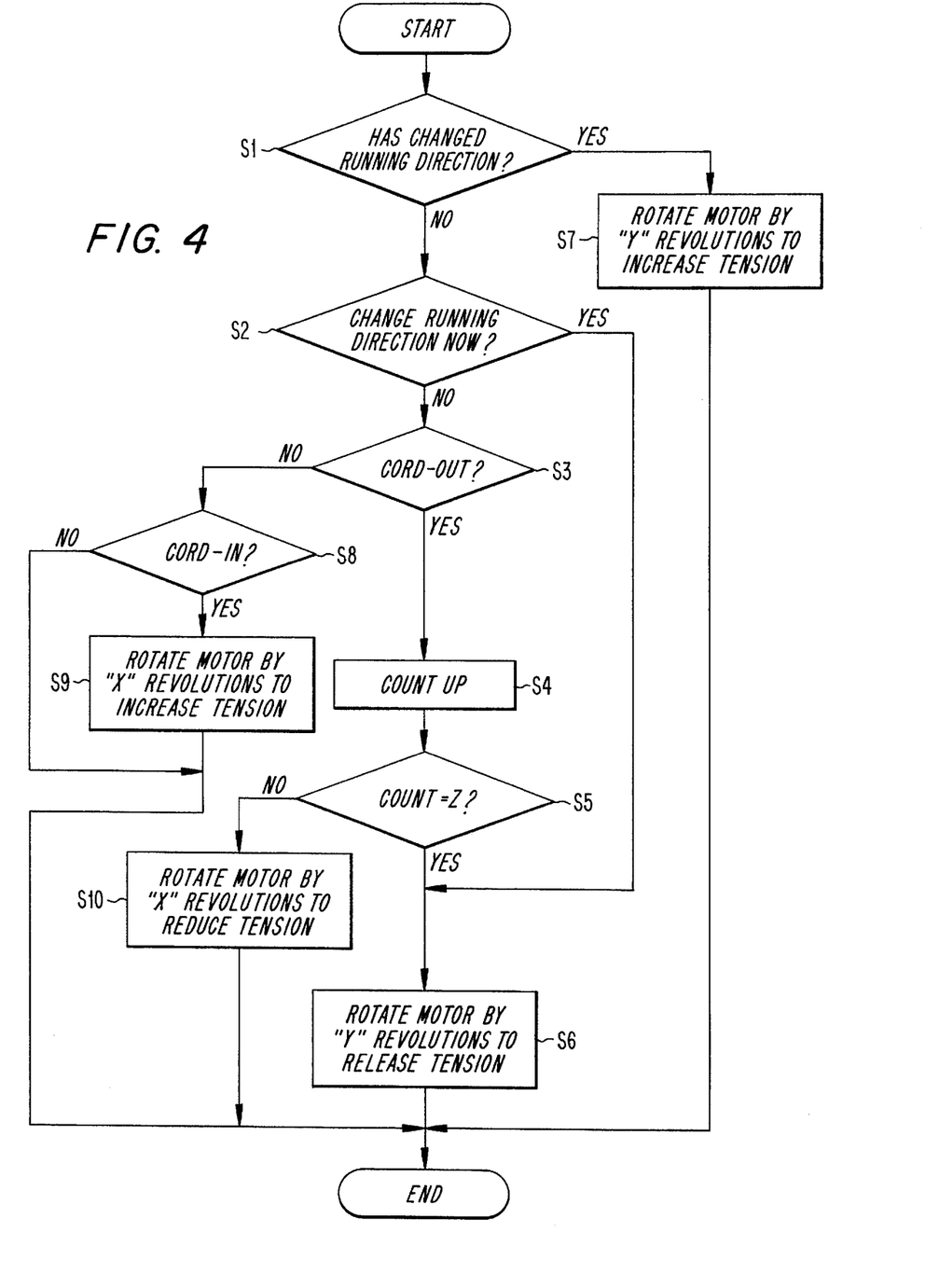
FIG. 4 is a flowchart of a method for controlling cord tension of the self-propelled robot in accordance with the present invention.

When starting the preset operation of the cord control device, the microcomputer 100 determines, at a step S1 of FIG. 4, whether the robot has changed its running direction. In order to determine whether the robot has changed its running direction, the microcomputer 100 calculates distances between the robot and the robot's surroundings on the basis of distance signals outputted from instruments such as ultrasonic sensors.

When it is determined, at the step S1, that the running direction of the robot was not previously changed, the answer of the step S1 is NO and this means that the robot is now changing its running direction or is running straight. In this case, the microcomputer 100 performs a next step S2. At the step S2, the microcomputer 100 determines whether the robot is changing now its running direction. In order to determine whether the robot is changing now its running direction, a variation of distance between the robot and the robot's surroundings is checked on the basis of the distance signals outputted from the ultrasonic sensor.

When it is determined, at the step S2, that the robot is not changing now its running direction, the answer at the step S2 is NO and this means that the robot is running straight so as to go away from the plug socket. In this case, the microcomputer 100 performs a next step S3 in order to determine whether the power cord 300 is being drawn out from the rotating disc 710.

Figure 2A:
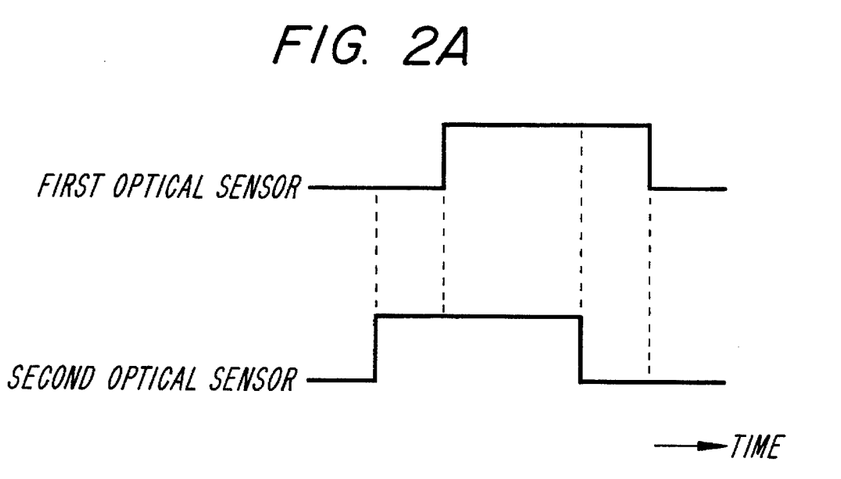
FIG. 2A is a waveform diagram of cord-out signals outputted from both first and second optical sensors of the control device of FIG. 1A during a cord out operation.

In order to discriminate whether the power cord 300 is drawn out from (as opposed to being drawn into) the disc 710, the microcomputer 100 compares the sequence at the signals outputted from both the first and second optical sensors 210 and 220. When the signals of the sensors 210 and 220 have the sequence shown in FIG. 2A, the answer at the step S3 is YES and this means that the cord 300 is being drawn out from the rotating disc 710. In this case, the microcomputer 100 performs a next step S4 in order to determine the draw-out speed of the cord 300. That is, at the step S4, the microcomputer 100 discriminates whether the cord 300 is drawn out from the rotating disc 710 at a fast speed or at a slow speed.

At the step S4, a microprocessor unit 120 of the microcomputer 100 inputs the number of pulses of the signal outputted from the first optical sensor 210 into the counter 110. Upon reception of the number of pulses of the signal, the counter 110 counts up the number of pulses from zero so as to increase the COUNT value by the number of pulses of the first optical sensor signal.

The microcomputer 100 in turn performs a next step S5 in order to discriminate whether the COUNT value of the counter 110 is Z. In this case, the count value Z is a first preset value, for example, Z=3, memorized in the microcomputer 100 in order for discriminating whether the cord 300 is drawn out from the rotating disc 710 at a fast speed. When the preset value Z is found to be the preset value of 3, the microcomputer 100 discriminates, at the step S5, whether the count value of the counter 110 has varied from zero to 3 for a unit time, for example, for 1 second.

Figure 5:
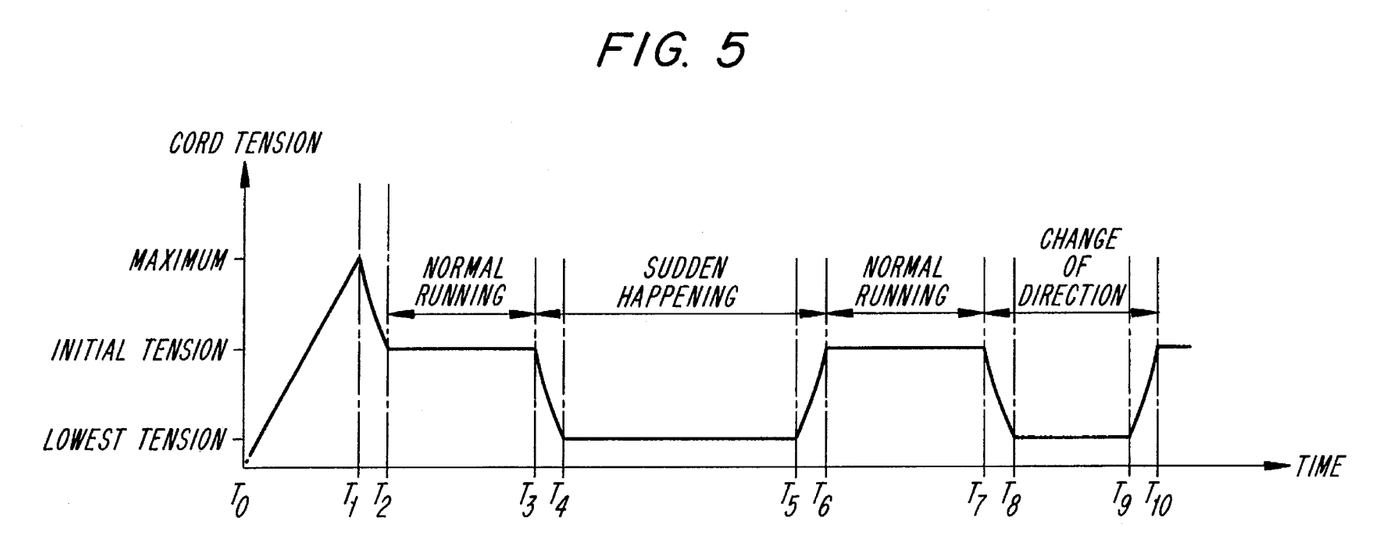
FIG. 5 is a diagrammatic view showing cord tension as a function of time used in the control method according to this invention.

When the COUNT value of the counter 110 is Z, the answer of the step S5 is YES and this means that the cord 300 is being drawn out from the rotating disc 710 at a fast speed as shown at the time $T_3$ of the graph of FIG. 5. In this case, the microcomputer 100 performs a next step S6 in order for prevention of possible deviation of the robot from its intended running passage. At the step S6, a motor drive signal for rotating the motor 500 forward or in the cord-out direction by Y revolutions is outputted from a signal output terminal 01 of the microcomputer 100 to the motor drive unit 500.

In this case, the value Y is a second preset value, for example, Y=350, memorized in the microcomputer 100 in order for making the tension applied on the cord 300, in occurrence of a sudden happening or in change of robot running path become a lowest level of tension or zero.

The motor 500 is thus applied with forward DC voltage from the motor drive unit 400, thus to be rotated forward by Y revolutions. At a result of Y revolutions of the motor 500 in the forward direction, the rotating disc 710 is rotated forward or clockwise by Y revolutions, thus to make the tension applied on the cord 300 become the lowest level of tension or zero as shown at the time from $T_3$ to $T_4$ of the graph of FIG. 5. In this case, the revolutions of the motor 500 is sensed by the Hall sensor 600. Upon sensing the motor revolutions, the Hall sensor 600 outputs a motor revolution signal to a signal input terminal I3 of the microcomputer 100. Upon reception of the motor revolution signal, the microcomputer 100 precisely rotates the motor 500 by Y revolutions on the basis of the counted value of the counter 110.

Hence, the self-propelled robot continues its running motion without deviation from its intended running passage since the tension applied on the cord 300 nearly becomes zero.

On the other hand, when it is determined, at the step S2, that the robot is changing now its running direction as shown at the time $T_7$ of the graph of FIG. 5, the answer of the step S2 is YES and this means that the tension applied on the cord 300 needs to become the lowest level of tension or zero. In this case, the microcomputer 100 performs the step S6 in order to rotate the motor 500 by Y revolutions and to release the tension applied on the cord 300 as shown at the time $T_8$ of the graph of FIG. 5. Hence, the self-propelled robot precisely changes its running direction without deviation from its intended running path since the tension applied on the cord 300 becomes zero.

When it is determined, at the step S1, that the robot has changed its running direction as shown at the time $T_9$ of the graph of FIG. 5, the answer of the step S1 is YES and this means that the tension applied on the cord 300 is the lowest level of tension or zero so that the cord 300 extending between the plug socket and the robot will have been loosened. In this case, the cord 300 needs to be drawn into the rotating disc 710. In order to achieve this, the microcomputer 100 performs a step S7 wherein a motor drive signal for rotating the motor 500 reversely or in the cord-in direction by Y revolutions or by 350 revolutions is outputted from the signal output terminal 01 of the microcomputer 100 to the motor drive unit 500.

The motor 500 is thus applied with reverse DC voltage from the motor drive unit 400, thus to be rotated reversely by Y revolutions. At a result of Y revolutions of the motor 500 in the reverse direction, the rotating disc 710 is rotated reversely or counterclockwise by Y revolutions, thus to make the tension applied on the cord 300 appropriately become the initial tension as shown at the time $T_{10}$ of the graph of FIG. 5.

On the other hand, when it is determined, at the step S3, that the cord 300 is not being drawn out from the rotating disc 710, the answer of the step S3 is NO and, in this case, the microcomputer 100 performs a step S8.

Figure 2B:
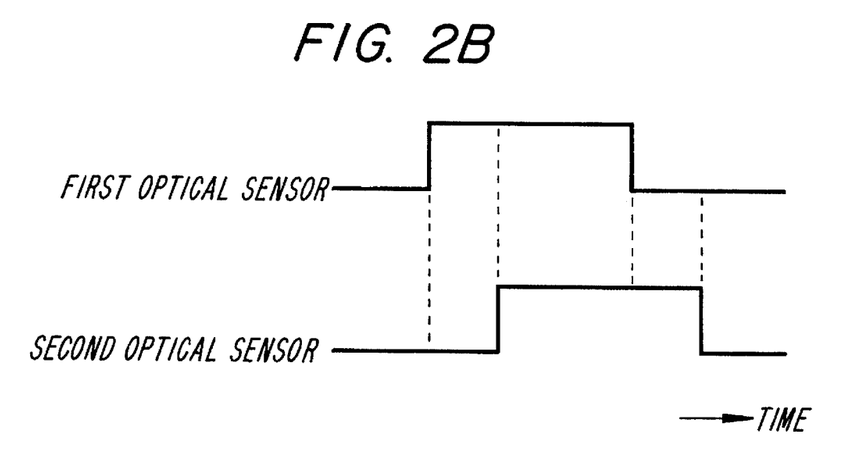
FIG. 2B is a waveform diagram of cord-in signals outputted from both the first and second optical sensors of the control device of FIG. 1A during a cord in operation.

At the step S8, the microcomputer 100 discriminates whether the power cord 300 is being drawn into the rotating disc 710. In order to discriminate whether the power cord 300 is being drawn into the disc 710, the microcomputer 100 compares the sequence of the signals outputted from both the first and second optical sensors 210 and 220. When the signals of the sensors 210 and 220 have the sequence shown in FIG. 2B, the answer of the step S8 is YES and this means that the cord 300 is being drawn into the rotating disc 710. In this case, the microcomputer 100 performs a next step S9 since the tension applied on the cord 300 is too weak.

At the step S9, a motor drive signal for rotating the motor 500 reversely or in the cord-in direction by X revolutions is outputted from the output terminal 01 of the microcomputer 100 to the motor drive unit 500. In this case, the value X is a third preset value, for example, X=8, memorized in the microcomputer 100 in order for appropriately changing the tension applied on the cord 300.

Thereafter, the motor 500 is applied with reverse DC voltage from the motor drive unit 400, thus to be rotated reversely by X revolutions. At a result of X revolutions of the motor 500 in the reverse direction, the rotating disc 710 is rotated reversely or counterclockwise by X revolutions, thus to draw an appropriate length, for example, 7 cm, of cord 300 into the rotating disc 710 and to let the cord 300 keep its initial tension.

On the other hand, when it is determined, at the step S8, that the cord 300 was not drawn into the disc 710, the answer of the step S8 is NO and this means that the cord 300 has stopped its draw-in or draw-out motion as shown at the time from $T_2$ to $T_3$ or at the time from $T_6$ to $T_7$ of the graph of FIG. 5. In this case, the present tension of the cord 300 should be kept. In order to achieve this, a motor drive stop signal is outputted from the signal output terminal 01 of the microcomputer 100 to the motor drive unit 400.

Hence, the motor 500 is applied with zero DC voltage from the motor drive unit 400, thus to stop its rotation. As a result of stoppage of the motor 500, the rotating disc 710 stops its rotation, thus to keep the tension of the cord 300 without change of the tension.

On the other hand, when it is determined, at the step S5, that the COUNT value of the counter 110 is not Z, the answer of the step S5 is NO and this means that the cord 300 is being drawn out from the rotating disc 710 at a slow speed as shown at the time from $T_2$ to $T_3$ or at the time from $T_6$ to $T_7$ of the graph of FIG. 5. In this case, the microcomputer 100 performs a step S10 in order for appropriately releasing the tension of the cord 300. In order for appropriately releasing the tension of the cord 300, a motor drive signal for rotating the motor 500 forward or in the cord draw-out direction by X revolutions is outputted from the output terminal 01 of the microcomputer 100 to the motor drive unit 500.

Thus, the motor 500 is applied with forward DC voltage from the motor drive unit 400, thus to be rotated forward by X revolutions. At a result of X revolutions of the motor 500 in the forward direction, the rotating disc 710 is rotated forward or clockwise by X revolutions, thus to draw out an appropriate length, for example, 7 cm, of cord 300 and to let the cord 300 keep its initial tension.

As described above, the device and method for controlling the tension of a power cord of a self-propelled robot in accordance with the present invention is such that the tension applied on the power cord upon the occurrence of a sudden happening or in response to a rapid turning motion of the robot during operation of the robot, becomes nearly zero, thereby preventing both a slippage of the robot wheels and a deviation of the self-propelled robot from its intended running path.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for controlling the tension on an electric power supply cord of a self-propelled robot, the cord being wound on a rotary spool carried by said self-propelled robot for undergoing unwinding and winding-up motions, and a motor for applying a rotary force to the spool, said method comprising the steps of:

A) causing said robot to propel itself to produce an unwinding of said cord, while applying a selected tension on said cord as it is being unwound;

B) sensing an unwinding speed of said cord as it is being unwound;

B1) maintaining at least said selected tension on said cord when said cord unwinding speed is sensed as being less than a predetermined speed, and B2) applying a rotary force from said motor to said spool in a cord-unwinding direction for reducing the tension on said cord to a value below said selected tension when said cord unwinding speed is sensed as being at or above said predetermined speed.

2. The method according to claim 1, wherein step B2 comprises applying an unwinding force to an inner end of a spiral spring, so that an outer end of said spring affixed to said spool supplies an unwinding force to said spool.

3. A method for controlling the tension on an electrical power supply cord of a self-propelled robot, the cord being wound on a rotary spool carried by said self-propelled robot for undergoing unwinding and winding motions, and a motor for applying a rotary force to the spool, said method comprising the steps of:

A) causing said robot to propel itself to produce an unwinding of said cord, while applying a selected tension on said cord as it is being unwound;

B) sensing whether said robot is changing its direction of travel; and

B1) maintaining at least said selected tension on said cord when said robot travel direction is sensed as not changing, and B2) applying a rotary force from said motor to said spool in a cord-unwinding direction for reducing the tension on said cord to a value below said selected tension when said robot travel direction is sensed as changing.

4. The method according to claim 3, wherein step B comprises applying an unwinding force to an inner end of a spiral spring, so that an outer end of said spring affixed to said spool applies an unwinding force to said spool.

* * * * *